(12) United States Patent
DiVenere et al.

(10) Patent No.: US 7,751,926 B2
(45) Date of Patent: Jul. 6, 2010

(54) POWER SOURCE SELECTOR

(75) Inventors: Douglas L. DiVenere, Neenah, WI (US); Joshua T. Stiever, Appleton, WI (US); Suzanne M. Feldkamp, Kaukauna, WI (US)

(73) Assignee: Illinois Tool Works, Inc., Glenview, IL (US)

( * ) Notice: Subject to any disclaimer, the term of this patent is extended or adjusted under 35 U.S.C. 154(b) by 273 days.

(21) Appl. No.: 11/678,333

(22) Filed: Feb. 23, 2007

(65) Prior Publication Data

US 2008/0208387 A1    Aug. 28, 2008

(51) Int. Cl.
G06F 19/00 (2006.01)
G05B 11/01 (2006.01)
G05B 15/00 (2006.01)

(52) U.S. Cl. .................. 700/180; 700/179; 700/17; 700/83; 700/97

(58) Field of Classification Search .................. 700/179, 700/180, 17, 83, 97
See application file for complete search history.

(56) References Cited

U.S. PATENT DOCUMENTS

| 6,574,527 | B1 * | 6/2003 | Courtney et al. ............ 700/179 |
| 2002/0095329 | A1 * | 7/2002 | Malik et al. .................. 705/10 |
| 2004/0059626 | A1 * | 3/2004 | Smallwood ................... 705/10 |
| 2005/0080641 | A1 * | 4/2005 | Ronning et al. .............. 705/1 |
| 2006/0142894 | A1 * | 6/2006 | Tsuchiya et al. ........... 700/180 |
| 2009/0037030 | A1 * | 2/2009 | Chidambaram et al. ..... 700/297 |

FOREIGN PATENT DOCUMENTS

| EP | 1445055 A | 8/2004 |
| EP | 1698420 A | 9/2006 |

OTHER PUBLICATIONS

The Lincoln Electric Company, XP-002484155, "The Procedure Handbook of Arc Welding," Twelfth Edition, 1973, pp. 9.3-8.
Air Liquide, XP-002484154, "SAF—Soudage Coupage—Catalogue General des Equipements et Produits D'apport," 1998, pp. 42, 43.
Database Internet, HTTP://WWW.CWA-ACS.ORG/PRESS_RELEASES/MILLER_070329_SMARTSELECT/PDF, XP-002484156, "New Miller Online SmartSelector," Feb. 26, 2007.
International Search Report and Written Opinion, PCT/US2008/052010, Jun. 26, 2008.

* cited by examiner

Primary Examiner—Ronald D Hartman, Jr.
(74) Attorney, Agent, or Firm—Quarles & Brady LLP

(57) ABSTRACT

A computerized method for aiding a user in selecting a proper power source for a welding, heating, or cutting application is provided. The user is prompted to provide data about the process type, power source type, and materials used in the application, and is provided with data regarding typical applications and skill levels required for various applications. By applying the process information provided and providing data prompted by the computer system, the user is guided to select an appropriate power source for the user's application and general requirements.

20 Claims, 10 Drawing Sheets

| | PROCESS BENEFITS | METAL TYPE | METAL THICKNESS | SKILL REQUIRED | COMMON APPLICATIONS |
|---|---|---|---|---|---|
| MIG WIRE | • BETTER CONTROL ON THIN METALS<br>• CLEAN WELDS WITH NO SLAG<br>• OUT-OF-POSITION WELDING | STEEL, STAINLESS, ALUMINUM | 24 GA+ (.025"+) | LOW | • AUTO RESTORATION & REPAIR<br>• FARM & RANCH REPAIRS<br>• HOME PROJECTS (RACKS, RAILINGS, ETC) |
| MIG FLUX CORED | • SAME WELDING MACHINE FOR MIG & FLUX CORE<br>• DOES NOT REQUIRE SHIELDING GAS<br>• SUITED FOR WINDY, OUTDOOR CONDITIONS | STEEL, STAINLESS | 1/8"+ | | • OUTDOOR REPAIRS<br>• REMOTE AREAS (WHERE A GAS BOTTLE DOESN'T FIT) |
| STICK | • SUITED FOR WINDY, OUTDOOR CONDITIONS<br>• FORGIVING ON DIRTY OR RUSTY METAL<br>• CAN WELD AT A LONG DISTANCE FROM MACHINE | STEEL, STAINLESS | 1/8"+ | MODERATE | • OUTDOOR REPAIRS – RUSTY METAL<br>• FARM EQUIPMENT |
| TIG | • CLEANEST PROCESS, NO SPATTER OR SMOKE<br>• PRECISE CONTROL, BETTER ON THIN METAL<br>• BEST-LOOKING, COSMETIC WELD BEADS | ALL WELDABLE METALS | .010"+ | HIGH | • AUTO RESTORATION & REPAIR<br>• MOTOR SPORTS<br>• SPORT AVIATION<br>• GENERAL REPAIR & FABRICATION<br>• METAL ARTWORK |
| ENGINE DRIVEN | • NO ELECTRICITY REQUIRED<br>• WELD AND GENERATOR POWER<br>• FIELD PORTABLE | ENGINE-DRIVEN WELDERS ARE CAPABLE OF MIG, TIG, AND STICK | | | • MAINTENANCE & REPAIR<br>• FABRICATION<br>• GENERATOR POWER |
| PLASMA | • PRECISE CUT WITH NARROW HEAT-AFFECTED ZONE PREVENTING WARPING & PAINT DAMAGE | ALL ELECTRICALLY CONDUCTIVE METALS | UP TO 1-3/4"+ | LOW | • MAINTENANCE & REPAIR<br>• AUTO RESTORATION & REPAIR |

POWER SOURCE SELECTOR

FIELD OF THE INVENTION

The present invention is directed to methods for selecting power sources for welding, heating and cutting applications.

BACKGROUND

Metal working processes, such as welding, cutting, and heating processes, and the equipment associated with these processes, can be very complex. In industrial applications, selecting appropriate processes and equipment is a job entrusted to skilled professionals, who devote entire careers to the study of the processes and equipment used in these applications, and to methods for perfecting the process for specific applications.

These processes, however, are also commonly used by a vast array of unskilled and semi-skilled workers, both professionally, and in do-it-yourself projects and repairs. For these unskilled and semi-skilled workers, choosing the appropriate process and equipment for the task at hand can be extremely difficult, particularly given the process-specificity of the equipment. Moreover, as metal working equipment is relatively expensive, it is particularly important for do-it-yourself project workers and small businesses to select an appropriate piece of equipment for a particular job, and to ensure that the selected equipment will be useful for future projects as well.

Metal working, and particularly welding equipment, however, is generally sold through distribution networks that cater largely to industrial customers. These distribution networks can be intimidating to a personal user or home hobbyist as these users are often unsure as to their welding equipment needs. Consequently, these users oftentimes avoid the welding distributors and will alternatively purchase equipment through retail outlets, such as home centers where they feel more comfortable and less intimidated by the retail sales "generalist" personnel. However, since the home center sales personnel are rarely trained to advise customers for these applications, a home hobbyist will often times leave the home center with a welder that is not suitable for their needs. It can be very difficult, therefore for an infrequent or casual user of welding or cutting equipment to get the necessary guidance and advice for selecting metal working processes and equipment for their applications. The present invention addresses these issues.

SUMMARY

The present invention provides a method for guiding a user to select a power source and associated equipment for welding, cutting, or heating applications. A user is presented with a series of questions and is provided with associated informational data to guide the user in answering these questions. These user can specify, for example, a welding process, a power source type, and a material to be welded. The user data is compared to a database of available power sources, and the user is presented with one or more recommendations of power sources that are suitable for the user's needs.

In one aspect of the invention, a method for aiding a user in selecting a power source for at least one of a welding a cutting, and a heating process is provided. In this method, process attribute data for a plurality welding, cutting, or heating process types is selectively displayed to a user. The user is then prompted to select a process type and at least one of a power source type and a process material type based on the process attribute data. The selected processes type and the power source criteria and material type data provided by the user is then compared to a database correlating a plurality of power sources to respective power source type, process type, and process material type data. As a result of the comparison, at least one power source is identified for the user.

In another aspect of the invention, an alternative method for selecting a power source for at least one of a welding a cutting, and a heating process is provided. In this method, a plurality of process types and corresponding process attribute data is displayed to a user, and the user is prompted to select one of the plurality of process types. The user is then prompted to select a material that will be used in the process. Based on the selected process and material, a power source is recommended to the user. The user can also be prompted to provide power source type data defining desired power source characteristics.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

FIG. 5 is a screen shot of a screen shot of a help screen of the embodiment of FIG. 3;

FIG. 6 is a screen shot of the screen for selecting a power source for a MIG application;

FIG. 7 is a screen shot of a screen for selecting a power source for an engine-driven application;

DETAILED DESCRIPTION OF THE PREFERRED EMBODIMENT

Figure 1:
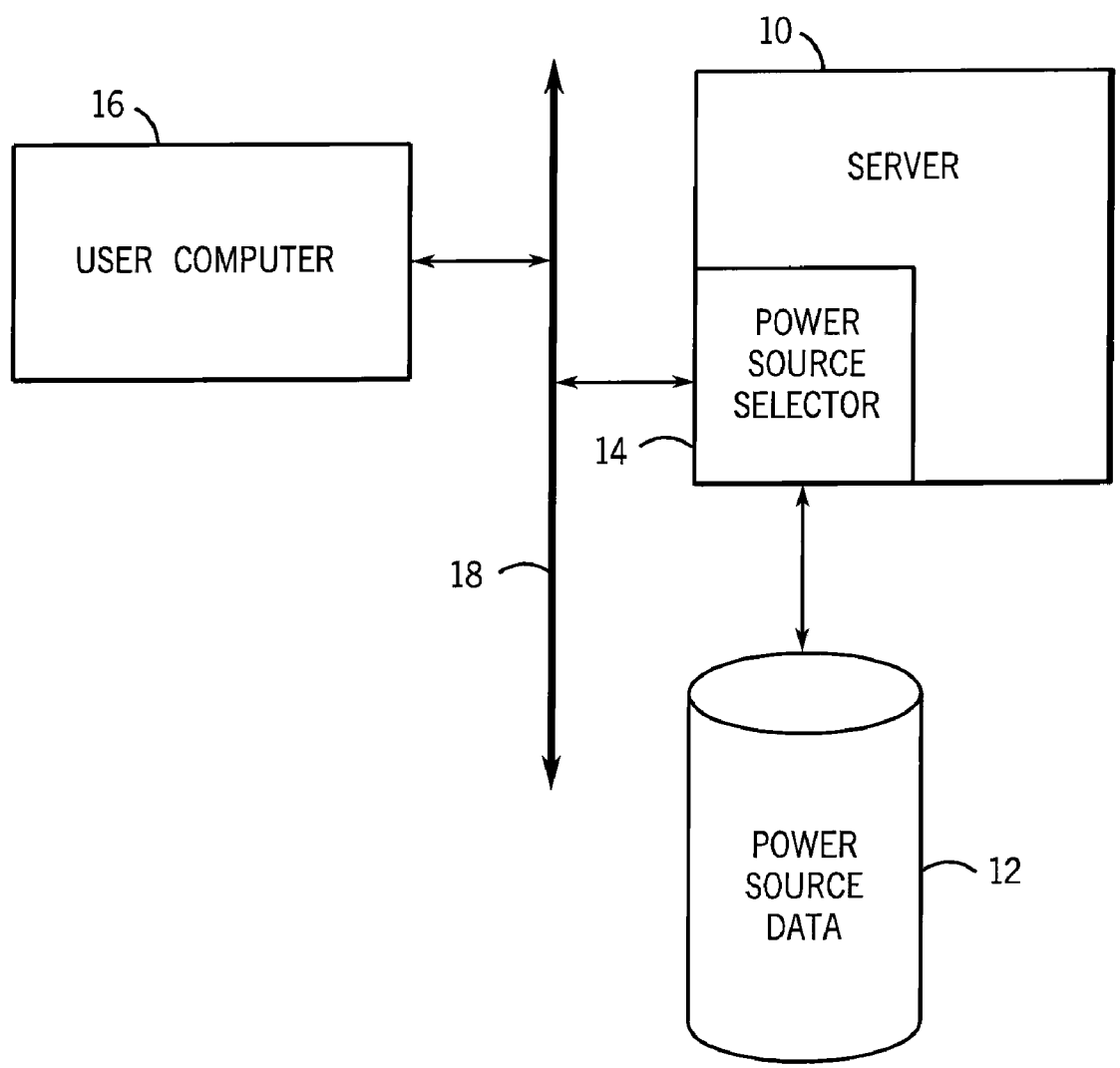
FIG. 1 is a block diagram illustrating a computer system for use in the present invention.

Referring now to the Figures and more particularly to FIG. 1, a block diagram of a computer system useful for the present invention is shown. The system includes a central computer or server 10 that is connected to a user computer 16 through a network 18. A power source selector 14 that prompts or queries the user for data to guide the user in purchasing power sources and other equipment for welding, cutting, and heating applications, is provided on the central computer 10, and is accessible to a user using the user computer 16 through the network 18. The central computer 10 includes or is coupled to a memory storage device 12 that includes a power source database correlating process type, material type, and power source type data to available power sources for purchase. The network 18 can be, for example, a LAN, WAN, wireless network, internet connection, or other type of wired or wireless communication system. Although a networked system including two computers is shown here, it will be apparent that any number of computers could be connected to the system. The user computer, moreover, can be provided as part of a kiosk or other system in a retail outlet store or other location. Additionally, although shown here as part of a computer network, the power source selector 14 and power source database can be provided directly on a stand-alone computer system, stored on a CD, DVD, disc, or other type of memory device, or otherwise be made available to a user.

Figure 2:
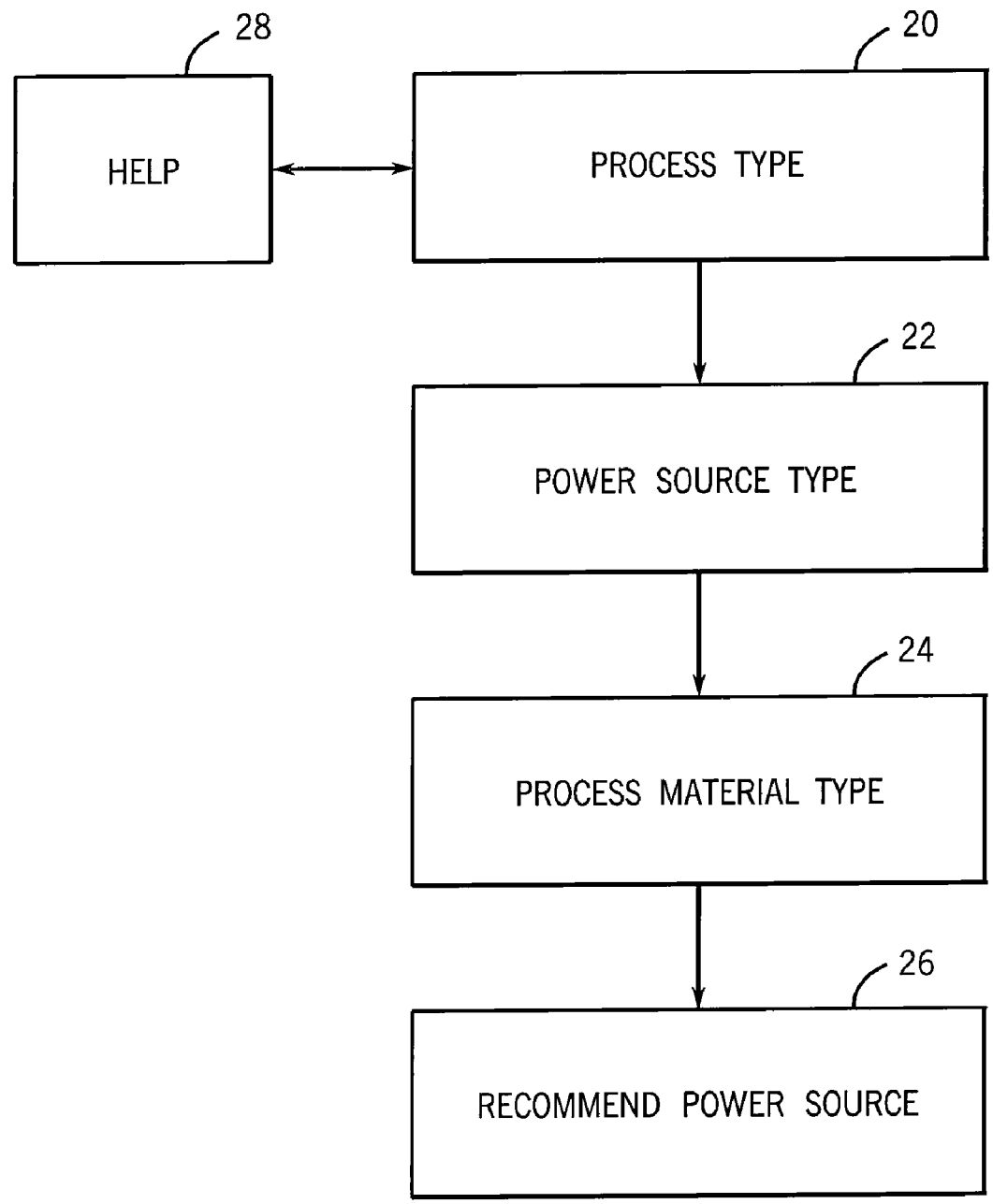
FIG. 2 is a flow chart illustrating the basic steps of the power source selector of FIG. 1.

Referring now to FIG. 2, a block diagram illustrating one embodiment of a basic power source selector 14 is shown. Initially, in step 20, the power source selector 14 queries or prompts a user at the user computer 16 to select a process type. The process type can be a welding process, a cutting process, or a heating process, and can include, for example MIG (Gas Metal Arc Welding or GMAW), TIG (Gas Tungsten Arc Welding or GTAW), or stick (Shielded Metal Arc Welding or SMAW) welding processes, and plasma cutting processes. An engine-driven process can also be selected. Preferably, while selecting a process, the user can either view directly or access a help screen 28, either by pressing a predetermined key on a keyboard, accessing a link to a help screen, or by scrolling a mouse over a list of available processes to access informational windows that provide data about the specific process. The help screen can provide process attribute data, which can include, for example, a skill level necessary for the selected process, a list of applications appropriate for the process, a list of materials appropriate for the process, and particular benefits of the selected process that differentiate the selected process from other available process options. The data may also include a list of consumables and accessory equipment that would be necessary to implement a selected process, comparative costs, or other types of data useful in selecting between processes.

After a process is selected in step 20, in step 22, the user is prompted or queried to define the characteristics of an appropriate power source by specifying power source type data. The power source type data indicates characteristics of the power source that are desired by or necessary to the user. This data can include, for example, a selection between a generator driven power source and a static power source, size and weight of the power source, whether the power source is to be mobile or stationary. In addition, the user can specify available input power sources that will be used to supply power to the power source. For engine driven power source applications, the user can be asked to identify whether the power source will be used primarily for welding, as a generator, or simultaneously as a welding power source and a generator. Noise or sound level requirements for the equipment can also be specified by the user, as described more fully below.

In step 24, the user is selectively also queried or prompted to enter data about the type of material to be welded or cut in the selected process. Here, for example, the user can be queried for data about the type of metal to be used in the application, specifying, for example, whether a material to be cut or welded is aluminum, steel, stainless steel, or other types of metals, or combinations of commonly-welded metals. A thickness or a range of thicknesses of the material to be welded or cut can also be acquired. Various other data, including types of gas and wire available for use, may also be requested.

After the process type, power source type, and process material type data is acquired from the user, in step 26, the process selector 14 compares the available data to the available power sources stored in the database in memory 12, and displays information about one or more power sources that would be suitable for the application to the user. This data can also include, for example, a price of the equipment, or a place to purchase the equipment. An online ordering system or telephone number to place an order can also be provided. Suggested auxiliary equipment, consumables, protective clothing, instructional manuals, and options for the suggested equipment can also be displayed and be made available for purchase. When no power source meets the criteria established by the user, the power source selector 14 can prompt the user to start over at step 20.

Figure 3:
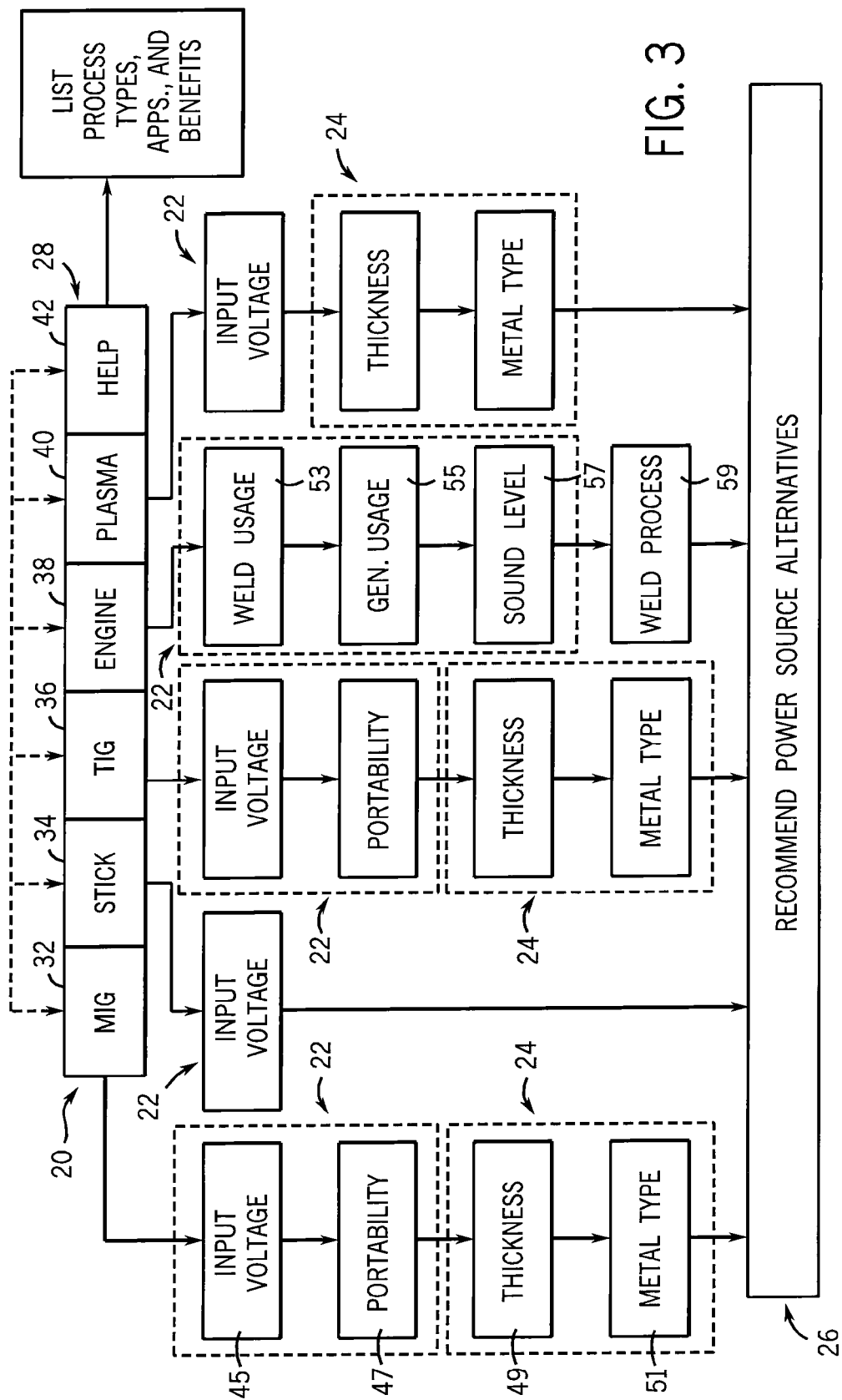
FIG. 3 is a detailed flow chart of one embodiment of a power source selector of FIG. 1.

Referring now to FIG. 3, a specific embodiment of a power source selector 14 constructed in accordance with the present invention is shown. Here, at an initial screen 30, the user is prompted to select a process type, as discussed above. The available process type selections include MIG (GMAW) 32, Stick (SMAW) 34, TIG (GTAW) 36, Engine Drive 38, and Plasma Cutting 40. A Help selection 42 is also available for help in selecting between the various process types, providing information about the benefits for the process types, skill level required, and benefits associated with the various processes. Although engine drive is shown here as a process type selection, it will be apparent that this selection could also be provided as a power source type, as described above.

After the process type is selected, the power source selector 14 continues to acquire the data necessary to recommend a power source for the selected process type. When the engine driven process 36 is selected, the user is queried to specify power source type parameters 22 and particularly to specify the balance of generator usage 55 to welding usage 53. In addition, the system queries the user to determine an acceptable sound or noise level 57 for the power source. Additionally, at step 59, the user is queried regarding the weld process to be used, which can include, for example, MIG, Stick, or TIG. This selection allows the power source selector 14 to filter between, for example, constant current (CC), constant voltage (CV) or CC/CV systems.

When any other process type is selected, the desired power source is assumed to be a static power source that is connected to an input power line. Therefore, to specify the power source type 22, the user is queried to provide an expected input voltage level 45 or a combination of expected input voltage levels, or a range of expected input power levels (e.g. 115, 230 or 115/230 VAC). The user is also queried to specify a desired level of portability 47 for the power source. Finally, the user is also asked to provide material type data 24 about the material to be welded, and particularly metal type 51 and thickness 49. In each of these queries, the questions directed to the user are customized based on the selected process and the characteristics of the available power sources in the database 12. Therefore, the power source selector 14 tailors the questions asked for the specific application, limiting the number of questions that a user is required to answer based on the process and power source type selected. Thus, as shown here, when the Stick process type is selected, the user is queried only about input voltage 45 to specify power source type 22, as no additional information is required. For the plasma cutting selection, only input voltage 45, material type 51, and material thickness 47 is required.

After all of the required data is acquired, the power source selector 14 again compares the process and features to the power sources in the database, and recommends, none, one, or a number of possible power sources to the user. The selector 14 can also identify a preferred power source for the application and/or provide additional data to the user for selecting between the recommended power sources, as discussed above.

Figure 4:
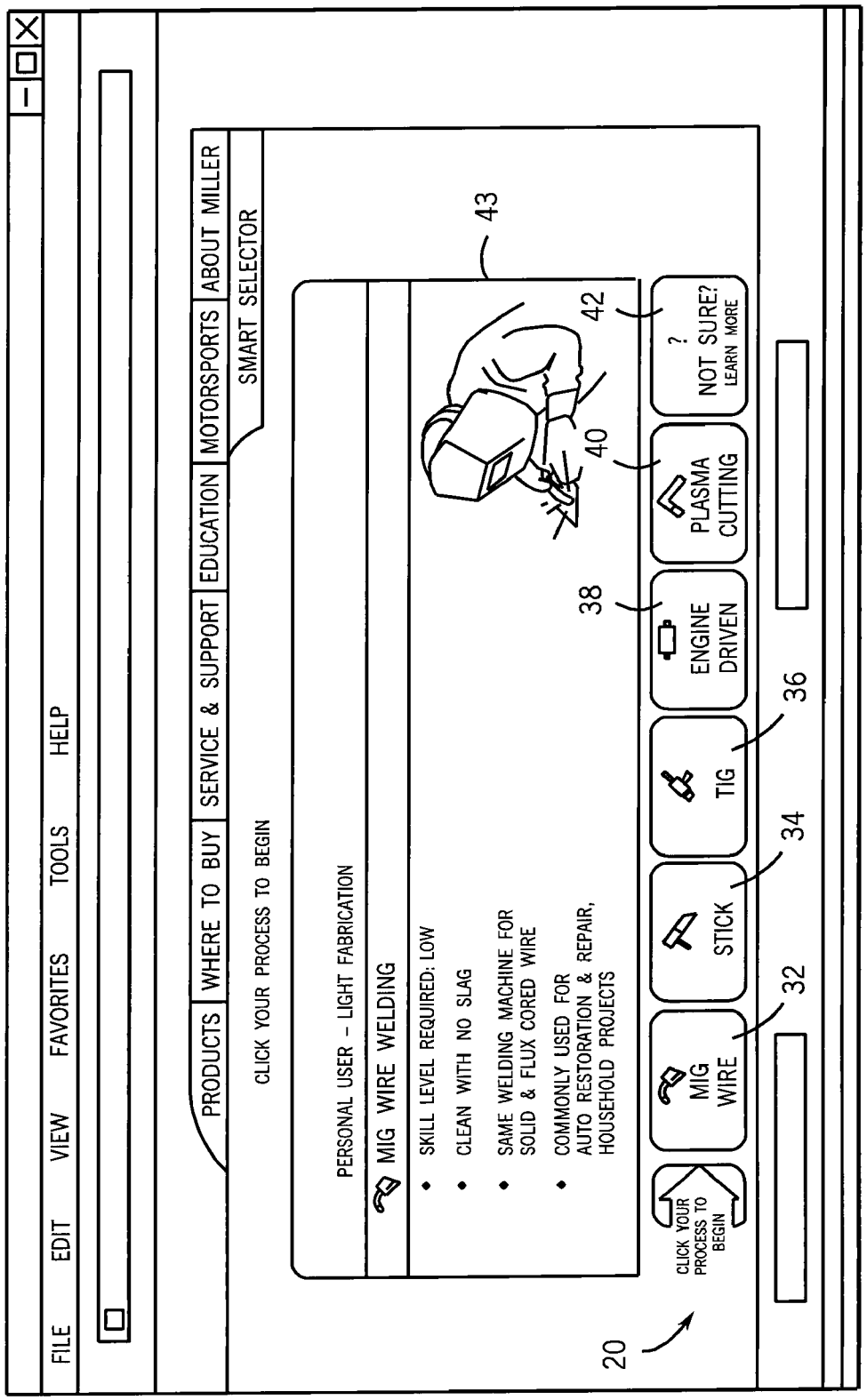
FIG. 4 is a screen shot of a display screen of the embodiment of FIG. 3.

Referring now to FIGS. 4-5, screen shots illustrating one embodiment of a power source selector as shown in the flow chart of FIG. 3 and provided at an internet web site are shown. Referring first to FIG. 4, upon entry to the power source selector system 14, a user is presented with a screen providing icons or buttons for selecting a process type 20 as described with reference to FIG. 3 above. As the user moves a mouse over each of the process icons, the display area 43 directly above the buttons provides process attribute data or information about the selected process which can include, for example, a skill level necessary for properly applying the process or common applications for the selected process, and benefits provided by selecting this process. If the user, having viewed this information, is uncertain about which process to select, the user can select a, "not sure" or "help" category 42 which, when selected, provides a more detailed help analysis, as shown in FIG. 5. Once the user enters the "not sure" screen, the user can again select a process type from the icons in the left hand column, as shown. Process attribute data for each of the processes defined in the left hand column is provided in a chart format, allowing the user to easily compare the attributes of the various processes that the user is selecting between. After this selection, the user is prompted to provide the appropriate data for the requested category as if selecting that process from the screen of FIG. 4.

Figure 6:
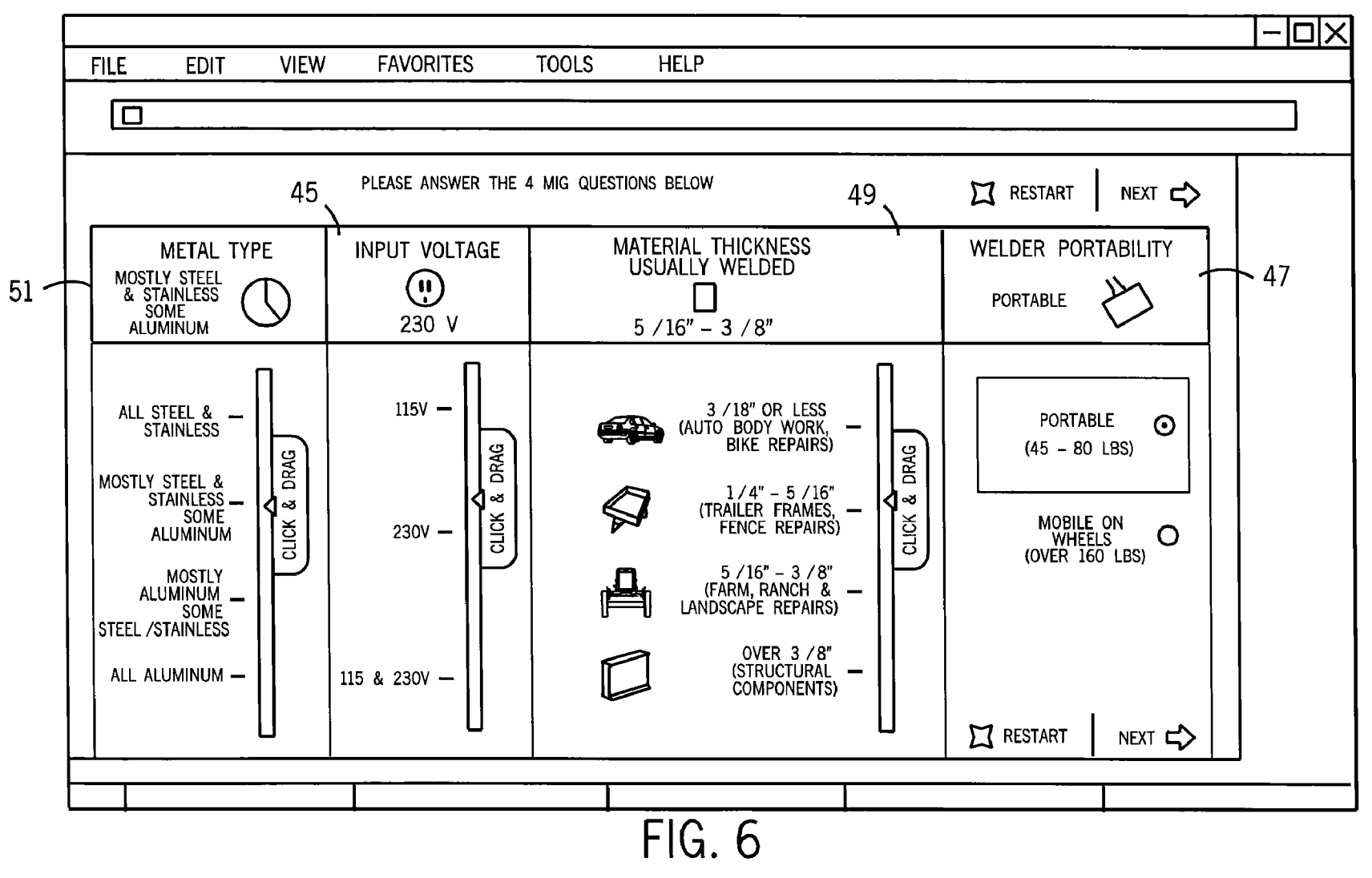

Referring now to FIG. 6, if the MIG button is selected from FIG. 4 or 5, the user is prompted to select material type and power source type data. These selections can be made using a "click and drag" selector, and radio button selectors, as shown here, typed into data entry screens, or selected using icons, multiple choice selections, through a series of automated question and answer sessions, or in other ways as will be apparent to those of skill in the art. Referring still to FIG. 6, for process material type, the user is queried about the type of metal 51 to be welded or cut, as well as a thickness 49 of the material. As shown here, the typical thickness of commonly-welded items, such as lawn chairs, boat trailers, or other items, can be provided as an aid to the user. Furthermore, a variety of commonly welded metals can be specified. Although not shown here, the user can now be queried for available types of gas or wire for use in a welding application.

As described above, when the MIG button is selected, the user is also prompted to enter power source type or characteristic data, including an expected or desired input voltage level 45, and a level of portability 51. The input voltage level can be, as described above 115, 230, 460, or other commonly available voltage levels, although the voltage levels, and also the frequency of AC power, can be varied based on the location of the user, in accordance with local power standards. The level of portability 51 can be characterized, as shown here, by querying the user to specify a preferred weight of the power source, and also to specify whether wheels are desired on the power source. Other mobility factors, such as whether a cart is desirable, can also be included in the query.

Although the screen shown here is tailored to MIG applications, similar types of data are acquired from the user when selecting the TIG, Stick, and Plasma Cutting process types, as described above with reference to FIG. 3. Also as discussed above, the questions presented to the user or the data requested from the user can be tailored based on the process, the material, or the types of power sources available for the applications specified by the user.

Figure 7:
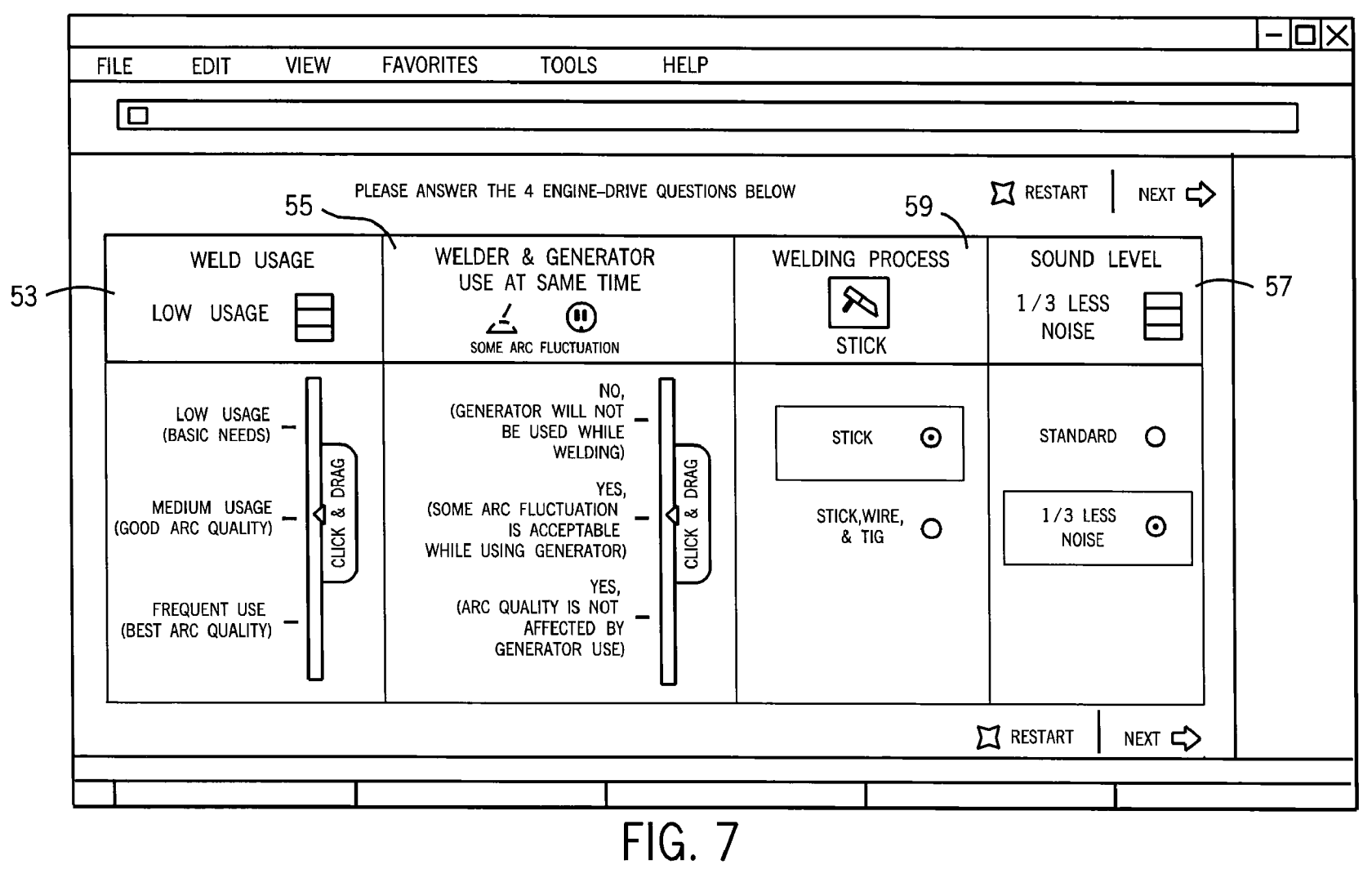

Referring now to FIG. 7, when the engine-driven process type is selected, user queries are directed specifically to information necessary to specify this type of equipment. Here, the power source type 22 is narrowed by determining the level of weld usage 53, e.g. whether this is a "basic needs" piece of welding equipment, which might also be used as a generator, or is intended to be used mainly for welding, where a higher quality arc may be of primary importance. The first selection, therefore, requires the user to establish a quality of arc required for the power source. The second selector prompts the user to indicate generator usage 55 and specifically whether the power source is expected to be used as a generator and a welder simultaneously. The level of acceptable noise 57 is also requested from the user. Finally, since, as shown here, the welding process 59 was not established initially from the first screen, the welding process 59 to be used is selected by the user. As shown here, the user can select between MIG, Stick, and TIG applications. Preferably, as described above, skill level data, material data, and benefits of using each of these processes can be either displayed directly to the user or can be made accessible through selective help screens then making the selection. Material type data could also be requested.

Figure 8:
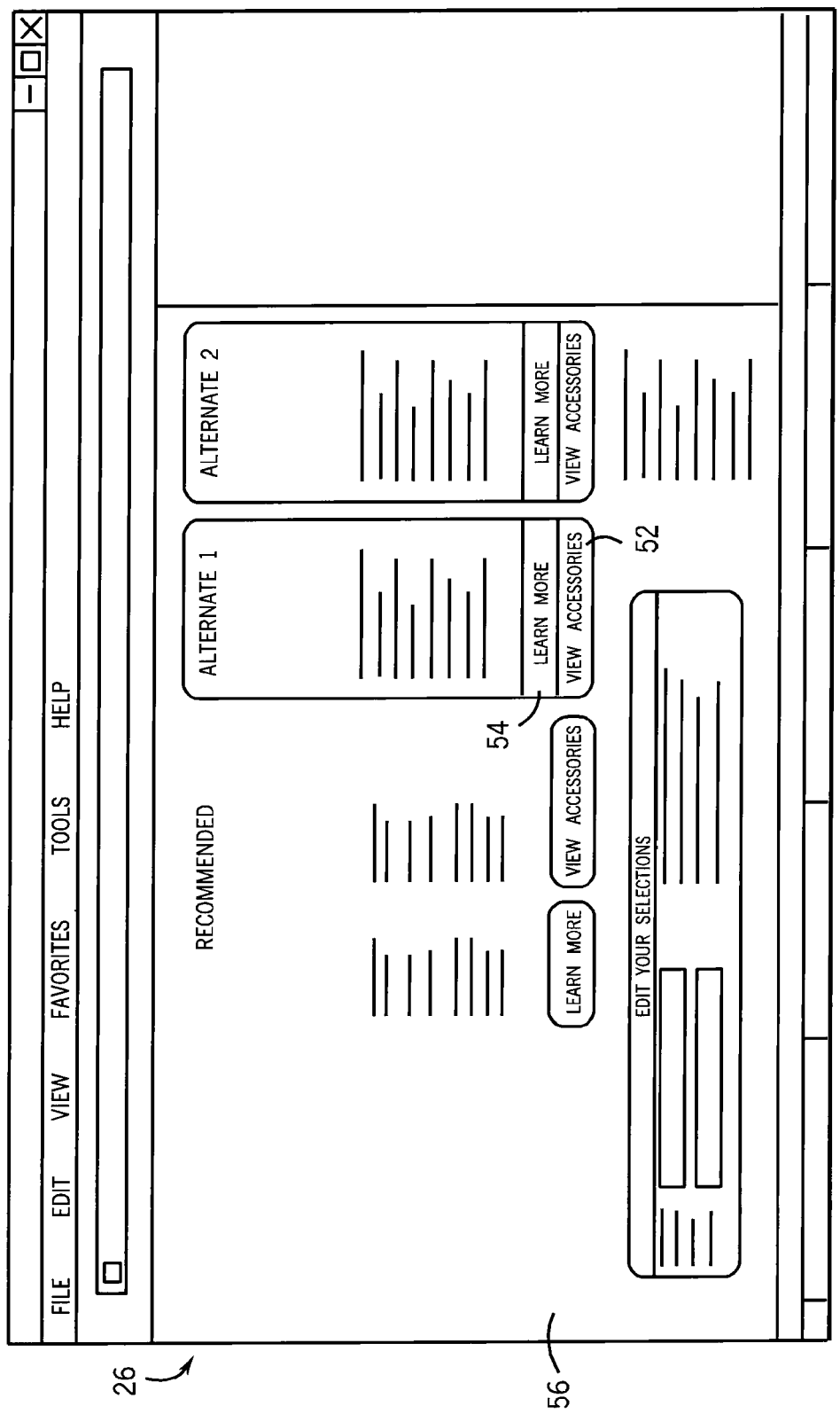
FIG. 8 is a screen shot illustrating a power source recommendation screen.

Referring now to FIG. 8, after all of the appropriate data is provided, and the user activates the "next" button 50, a recommendation 16 is made to the user. Here, the most appropriate power source based on the defined application is recommended, and one or more alternative may also be provided. As shown here, the user can access links to additional data 54 and accessory equipment 52. Additionally, the user can edit the selected parameters 56 from this screen to acquire additional recommendations. Although not shown here, based on the parameters selected above, auxiliary equipment, consumables, accessories, clothing, instructional manuals, and other items can also be suggested to the user, as described above. Furthermore, a link allowing the user to purchase selected items on line can be provided, as can telephone numbers for ordering the equipment, and information about stores or other outlets where the equipment is available.

Figure 9:
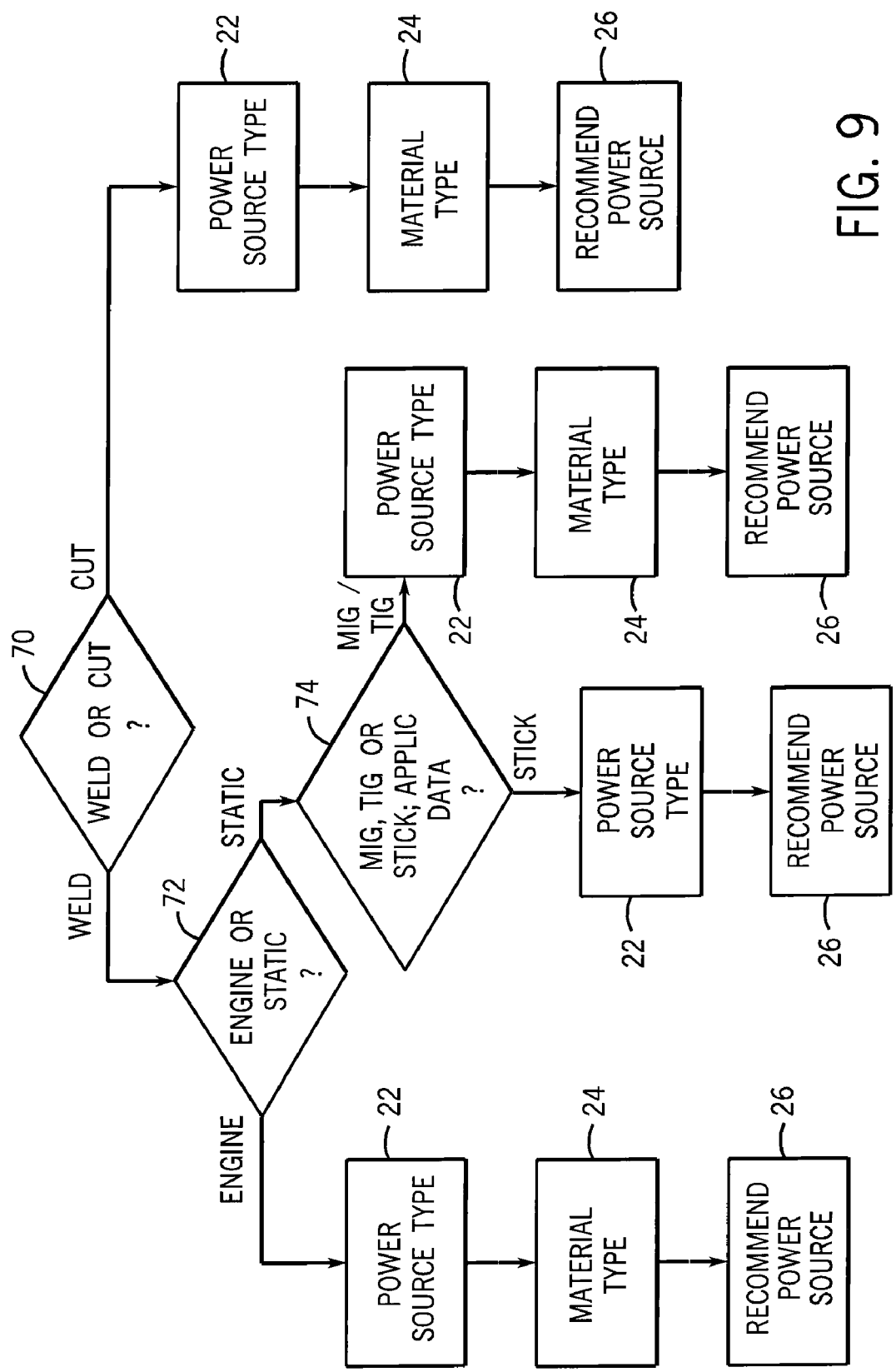
FIG. 9 is a flow chart of an alternate embodiment of a power source selector.

Although a specific order for acquiring the data for recommending a power source is described above, it will be apparent that this order can be varied, and that either more questions or fewer questions can be provided in the inquiry while achieving similar results. Referring now to FIG. 9, one alternate example is shown. Here, initially, the user is queried to determine whether the application is a welding or a cutting application 70. If cutting is selected, the user is queried only for data appropriate to cutting applications. If welding is selected, the user is queried for data relating to welding applications. When welding is selected, the user is initially queried to determine whether the use is for an engine-driven or static machine 72, and appropriate questions are asked based on the selected type. Subsequently, the user is queried to specify a weld process type 74. Various other orders for acquiring the data will be apparent.

Figure 10:
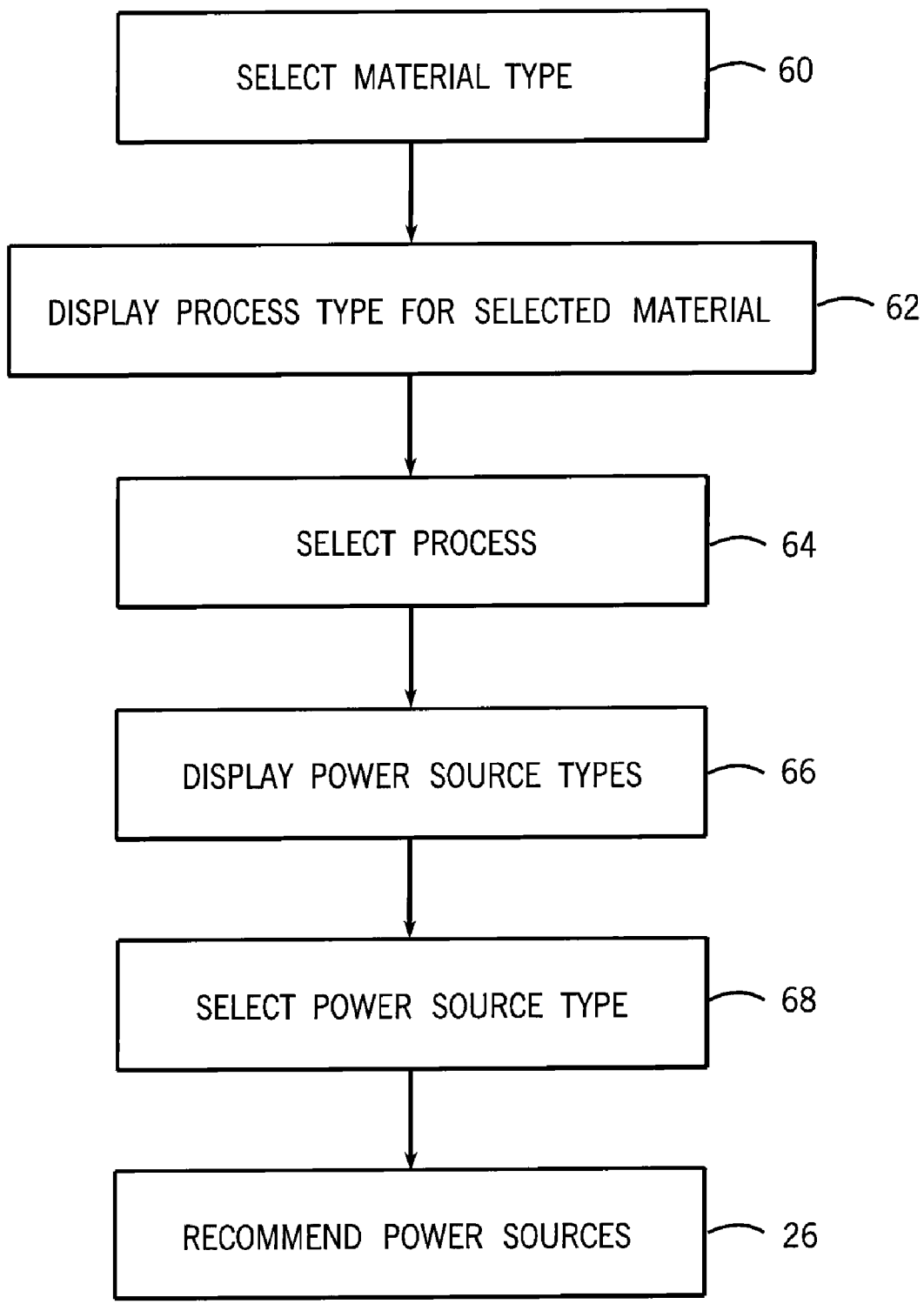
FIG. 10 is a flow chart of another alternate embodiment of a power source selector.

Referring now to FIG. 10, another exemplary alternative is shown. Here, the user is initially queried to enter data about the material 14 to be welded or cut 60, including metal type and thickness data as described above. Based on this selection, appropriate process types 12 can be displayed, and the user can be queried to select a process 64. After the material and process are selected, a display of power source types can be provided 66 and the user queried to specify a power source type 68. As described above, help screens can be provided to the user to help the user select an appropriate power source and process for their individual needs. A power source can then be recommended.

Although a number of specific methods are described, it will be apparent that many ways for structuring the flow of questions to a user are available. It should, therefore, be understood that the methods and apparatuses described above are only exemplary and do not limit the scope of the invention, and that various modifications could be made by those skilled in the art that would fall under the scope of the invention. To apprise the public of the scope of this invention, the following claims are made:

We claim:

1. A computer system for aiding a user in selecting a power supply for at least one of a welding, a cutting, and a heating process, the computer system comprising:

a user computer;

a network connected to the user computer; and a central computer connected to the user computer through the network, the central computer comprising a memory storage device storing a database correlating a plurality of power sources to at least one of process data, material data, power source data, and process attribute data;

wherein the central computer is programmed to:

display at least one of a process data selection, a power source data selection, and a material data selection and prompt the user to select at least one process data selection, power source data selection, and material data selection from the user computer;

compare the selected process data selection, power source data selection, or material data selection to the database to correlate a plurality of power sources to the selected process data selection, power source data selection, and material data selection; and display at least one power source based on the selected one of the power source data selection, process data selection, or process material data selection for the user.

2. The computer system as recited in claim 1, wherein the central computer is further programmed to display process attribute data associated with at least one of the displayed process data selections, the process attribute data including at least one of a skill level necessary for applying the process, a common application for the selected process, and a benefit provided by the selected process.

3. The computer system as recited in claim 1, wherein the central computer is further programmed to prompt a user to select a help category, and, when the help category is selected, to display a chart allowing a user to display process attributes for a selected process.

4. The computer system as recited in claim 2, wherein the central computer is further programmed to prompt a user to select a material data selection and a power source data selection using a click and drag selector.

5. The computer system as recited in claim 1, wherein the central computer is further programmed to prompt the user to select a process data selection from at least one of a GMAW, a GTAW, and an SMAW welding process.

6. The computer system as recited in claim 1, wherein the central computer is further programmed to prompt the user to select the power source data selection from at least one of an engine drive and a static power source.

7. The computer system as recited in claim 1, wherein the central computer is further programmed to prompt the user to select the process material data selection as at least one of a metal and a material thickness.

8. The computer system as recited in claim 1, wherein the central computer is further programmed to prompt the user to select at least one of a noise level, a weld usage level, and a generator usage level when the selected power source is an engine drive.

9. The computer system as recited in claim 1, wherein the central computer is further programmed to prompt the user to select an input voltage level when the selected power source is a static power source.

10. The computer system as recited in claim 1, wherein the central computer is further programmed to prompt the user to select a level of mobility required for the selected power source.

11. The computer system as recited in claim 1, wherein the central computer is further programmed to prompt the user to select between a welding process type and a cutting process type.

12. The computer system as recited in claim 1, wherein the central computer is further programmed to prompt the user to select between a welding process and a plasma cutting process.

13. The computer system as recited in claim 1, wherein the network comprises at least one of an internet link, a LAN, a WAN, and a wireless network.

14. The computer system as recited in claim 1, wherein the central computer is further programmed to provide an indicator of a thickness of at least one commonly-welded item to the user.

15. The computer system as recited in claim 1, wherein the central computer is further programmed to prompt the user to select between a low usage, a medium usage, and a frequent usage parameter to identify the frequency of welding.

16. A method for aiding a user in selecting a power supply for at least one of a welding, a cutting, and a heating process, the method comprising:

providing a display at a user computer prompting a user to select at least one of a process data selection, a material data selection, and a power source data selection, and transmitting the user selection through a network to a central computer; and comparing the user selection to a database stored in a memory storage device connected to the central computer and correlating the selected at least one of a process data selection, material data selection, power source data selection, and process attribute data to power source data stored in the database to identify a power source that correlates with the user data;

transmitting a power source selection to a display at the user computer; and displaying the power source selection to the user.

17. The method as recited in claim 16, further comprising the step of providing a display at the user computer prompting the user to access process attribute data associated with at least one of the displayed process types, the process attribute data including at least one of a skill level necessary for applying the process, a common application for the selected process, and a benefit provided by the selected process; transmitting the user selection to the central computer; retrieving the process attribute data from the memory storage; and displaying the process attribute data at the user computer.

18. The method as recited in claim 16, further comprising the step of displaying a prompt at the user computer to provide access for the user to select a help category, and, when the prompt is activated, transmitting the request to the central computer, retrieving a chart from the memory storage and displaying process attribute data at the user computer.

19. The computer system as recited in claim 16, wherein the step of prompting a user to select at least one of a process data selection, material data selection, and a power source data selection comprises displaying a click and drag selector and prompting the user to select a material data selection and a power source data selection using the click and drag selector.

20. The method as recited in claim 16, wherein the step of prompting a user to select a material data selection comprises prompting the user to select at least one of a metal and a material thickness at the user display and transmitting the selected at least one of a metal and a material thickness to the central computer.

* * * * *